(12) United States Patent
Anderson

(10) Patent No.: US 10,955,516 B2
(45) Date of Patent: Mar. 23, 2021

(54) OBJECT DETECTION ENHANCEMENT USING RECEIVER PERSPECTIVE

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 16/019,202

(22) Filed: Jun. 26, 2018

(65) Prior Publication Data

US 2019/0049545 A1 Feb. 14, 2019

(51) Int. Cl.
| | |
|---|---|
| *G01S 3/14* | (2006.01) |
| *G01S 3/802* | (2006.01) |
| *G01S 7/48* | (2006.01) |
| *G01S 17/04* | (2020.01) |
| *G01S 17/931* | (2020.01) |
| G08G 1/16 | (2006.01) |
| G01S 13/931 | (2020.01) |

(52) U.S. Cl.
CPC .............. *G01S 3/14* (2013.01); *G01S 3/8022* (2013.01); *G01S 7/4802* (2013.01); *G01S 17/04* (2020.01); *G01S 17/931* (2020.01); *G01S 2013/9316* (2020.01); *G08G 1/161* (2013.01)

(58) Field of Classification Search
CPC ........ G01S 3/14; G01S 3/8022; G01S 7/4802; G01S 17/04; G01S 17/931; G01S 2013/9316; G01S 2013/932; G01S 2013/9323; G01S 2013/9324; G08G 1/161; G08G 1/163
See application file for complete search history.

(56) References Cited

U.S. PATENT DOCUMENTS

| | | | | |
|---|---|---|---|---|
| 6,263,279 B1 * | 7/2001 | Bianco | ............... | A63B 71/0619 342/357.52 |
| 10,037,231 B1 * | 7/2018 | Jakhetiya | ............ | H04L 67/2847 |
| 10,514,837 B1 * | 12/2019 | Li | ......................... | G06F 3/0482 |
| 2012/0281594 A1 * | 11/2012 | Stewart | ................. | H04W 16/14 370/259 |

(Continued)

OTHER PUBLICATIONS

Proxy. (2016). The American Heritage Dictionary of the English Language (6th ed.). Houghton Mifflin. Credo Reference: https://search.credoreference.com/content/entry/hmdictenglang/proxy/0 (Year: 2016).*

(Continued)

*Primary Examiner* — Bernarr E Gregory
*Assistant Examiner* — Fred H Mull
(74) *Attorney, Agent, or Firm* — Schwabe, Williamson & Wyatt, P.C.

(57) ABSTRACT

Apparatuses and methods for determining the perspective of a receiver of a transmission from the transmitting station are disclosed. The receiver may determine an angle of arrival of the transmission. The angle of arrival may be used to generate perspective information, which may then be transmitted to the transmitting station for use in enhancing recognition and detection of the receiver. In embodiments, the perspective information may comprise an image or images of the receiver generated from a model of the receiver. In embodiments, the transmission may be a millimeter wave transmission.

23 Claims, 7 Drawing Sheets

(56) References Cited

U.S. PATENT DOCUMENTS

| | | | | |
|---|---|---|---|---|
| 2014/0148135 A1* | 5/2014 | Haney | ................... | H04W 4/50 |
| | | | | 455/414.1 |
| 2014/0316616 A1* | 10/2014 | Kugelmass | ........... | G06T 11/206 |
| | | | | 701/8 |
| 2017/0301232 A1* | 10/2017 | Xu | ................... | G08G 1/096775 |
| 2018/0090004 A1* | 3/2018 | Kuraoka | ................ | G08G 1/161 |
| 2018/0219595 A1* | 8/2018 | Liu | ........................ | H04B 7/063 |
| 2019/0120934 A1* | 4/2019 | Slutsky | .................... | G06T 7/33 |

OTHER PUBLICATIONS

A. Ke et al., Pseudo-Doppler Audio Direction Finder, 6.101 Analog Electronics Laboratory, MIT, Spring 2016 (Year: 2016).*

Shahmansoori et al., Position and Orientation Estimation through Millimeter Wave MIMO in 5G Systems, Oct. 15, 2017, 31 pages.

Sanchis et al., A Novel Simultaneous Tracking and Direction of Arrival Estimation Algorithm for Beam-Switched Base Station Antennas in Millimeter-Wave Wireless Broadband Access Networks, in Proc., IEEE Antennas Propag. Soc. Int. Symp., San Antonio, TX, USA, Jun. 2002, pp. 594-597.

Deng et al., "Mm-Wave MIMO Channel Modeling and User Localization Using Sparse Beamspace Signatures", in Proc. Int. Workshop Signal Process. Adv. Wireless Commun. (SPAWC), Toronto, ON, Canada, Jun. 2014, pp. 130-134.

Vari et al., "mmWaves RSSI indoor network localization," in Proc. Int. Conf. Commun. (ICC), Sydney, NSW, Australia, Jun. 2014, pp. 127-132.

Qualcomm, "Mobilizing mmWave with 5G" May 14, 2018. 2 pages, https://www.qualcomm.com/videos/mobilizing-mmwave-5g.

* cited by examiner

COMPUTER-READABLE STORAGE MEDIUM
602

PROGRAMMING INSTRUCTIONS 604
TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) DESCRIBED THROUGHOUT THIS DISCLOSURE.

FIG. 6

OBJECT DETECTION ENHANCEMENT USING RECEIVER PERSPECTIVE

TECHNICAL FIELD

Embodiments described herein generally relate to object detection in the context of a vehicle. In particular, apparatuses and systems for enhancing the detection of an object, such as another vehicle, using perspective information from a receiver co-located with the object are described.

BACKGROUND

Modern vehicles, such as automobiles, may be equipped with various safety systems, such as blind spot detection, adaptive cruise control, and automatic emergency braking. These systems may be part of a computer assisted or fully autonomous driving (CA/AD) vehicle. A CA/AD vehicle may be configured with systems that assist a driver (such as lane keeping and automatic emergency braking), and/or partially or fully allow the vehicle to navigate autonomously (e.g. self driving vehicles). Assist and safety systems, as well as navigation and/or driving systems for fully autonomous vehicles, may use object detection and recognition to help ensure safe navigation and obstacle avoidance. To accomplish object detection and recognition, CA/AD vehicles may be equipped with a variety of sensors that provide data to various vehicle navigation systems. CA/AD vehicles may also include other vehicle types such as unmanned aerial vehicles (commonly referred to as "drones"), which likewise may use object detection and recognition as part of navigation and obstacle avoidance.

Along with various sensors, CA/AD vehicles may be configured for vehicle to vehicle (V2V) and/or vehicle to any (V2X) communications, to allow CA/AD vehicles to coordinate movements to help ensure safety. Such communications may be accomplished via radio links of various types, which allows the exchange of data between vehicles.

BRIEF DESCRIPTION OF THE DRAWINGS

FIG. 6 is a block diagram of a computer-readable storage medium that can be used to implement some of the components of the system or methods disclosed herein, according to various embodiments.

DESCRIPTION OF EMBODIMENTS

Figure 1A:
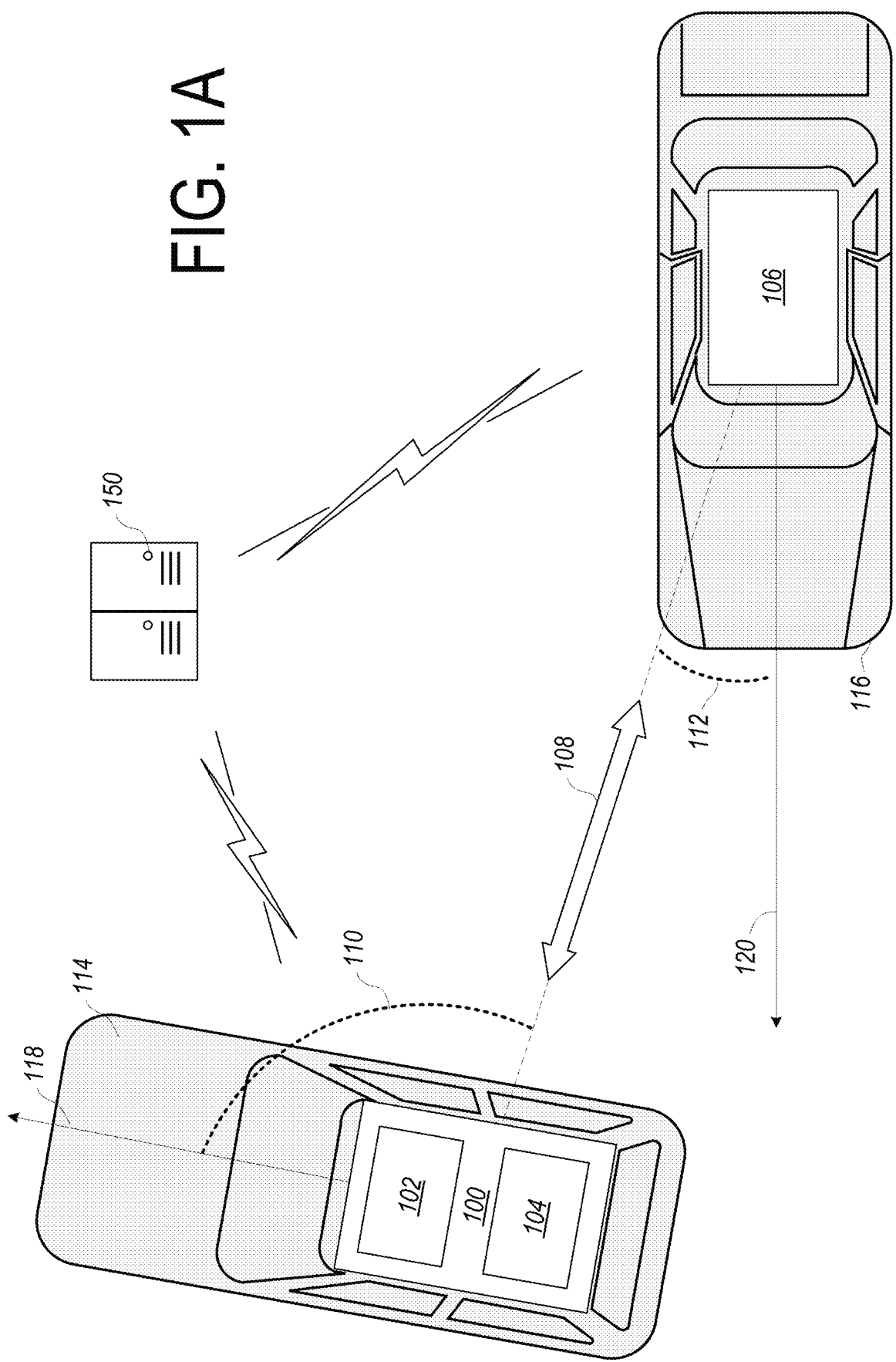
FIG. 1A is a diagram of a system for using the angle of received transmissions to determine a perspective of the receiver to enhance object detection, according to various embodiments.

One of the ways in which a CA/AD vehicle navigates safely around other vehicles is by performing object detection. A CA/AD vehicle may be equipped with various sensors such as cameras, radar, LIDAR and/or similar technologies that can provide 2D or 3D data of the surrounding environment. Various object detection algorithms may be performed on this data. In some such implementations, larger objects, such as vehicles, may be detected as a series of smaller, simpler objects, e.g. for cars, wheels as circles, windows and headlamps as polygons, etc. Particular arrangements of shapes may be recognized as a larger, composite object, such as a vehicle.

One challenge with object detection of three-dimensional objects, especially relatively complex 3-D objects such as a vehicle, is reliably detecting the object as the orientation of the object shifts relative to a moving viewer. For example, a vehicle viewed from the side may be recognized as a set of circles presented by the wheels, placed proximate to a series of polygons presented by the windows and doors. The same vehicle viewed from the front may present a series of polygons without circles (depending upon the shape of the headlamps). Viewing the same vehicle from a quartering view may present one or more ovals from the visible wheels, along with more polygons. As a viewer moves, the perspective of the vehicle may continuously change as various vehicle components move into and out of view, regardless of the type of technology used to view the vehicle, e.g. visual camera, LIDAR, radar, etc. Similarly, the perspective of the vehicle may continuously change where the viewer is stationary and the vehicle is in motion, or both the vehicle and the viewer are in motion. This may be further complicated by the variety of different types and configurations of vehicles that may be encountered, e.g. trucks, SUVs, passenger cars, crossovers; for aerial vehicles, quadcopters, hexacopters, flying wings, etc. To help accurately detect a proximate object, then, the object detection system of a CA/AD vehicle of the present disclosure is configured to detect the range of shapes presented by the object, for a range of possible objects to be detected, as the perspective of the CA/AD vehicle shifts.

The object detection system is assisted in its task if it is aware of the orientation of the object to be detected relative to the object detection system. If aware of the object's orientation, the object detection system is configured to look for a specific pattern of shapes corresponding to the expected appearance of the object based upon its orientation, instead of attempting to match detected objects against multiple possible perspectives. This may allow the object detection system to save on computing resources, and may also allow for more rapid detection, which can improve safety by allowing more time for a CA/AD vehicle to maneuver to avoid obstacles.

Vehicles that are equipped for communications between vehicles or with remote servers (e.g., V2V or V2X communications) may be configured to receive information via wireless communication links with other proximate vehicles. By using direction finding techniques, a vehicle receiving a transmission may be able to determine its orientation relative the source of the transmission. The transmission source may be another vehicle. Once determined, the receiving vehicle can, in one example, send information back to the transmission source about the receiving vehicle when viewed from the perspective of the transmission source. The transmission source or vehicle may then use the information to generate a model or representation of the receiving vehicle, potentially useful for object recognition. In another example, the receiving vehicle may send an image or images to the transmission source with a model or representation of the receiving vehicle's appearance from the perspective of the transmission source, possibly to be used directly with object recognition. In still other examples, communications between vehicles may be moderated by a cloud or edge server, which may also be responsible for computing the model or representation of the receiving vehicle. Other advantages may be realized, as discussed below in greater detail.

As used herein, the term semi-autonomous driving is synonymous with computer-assisted driving. The terms do not mean exactly 50% of the driving functions are automated. The percentage of driving functions automated may be a fraction of a percent to almost 100%.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1B:
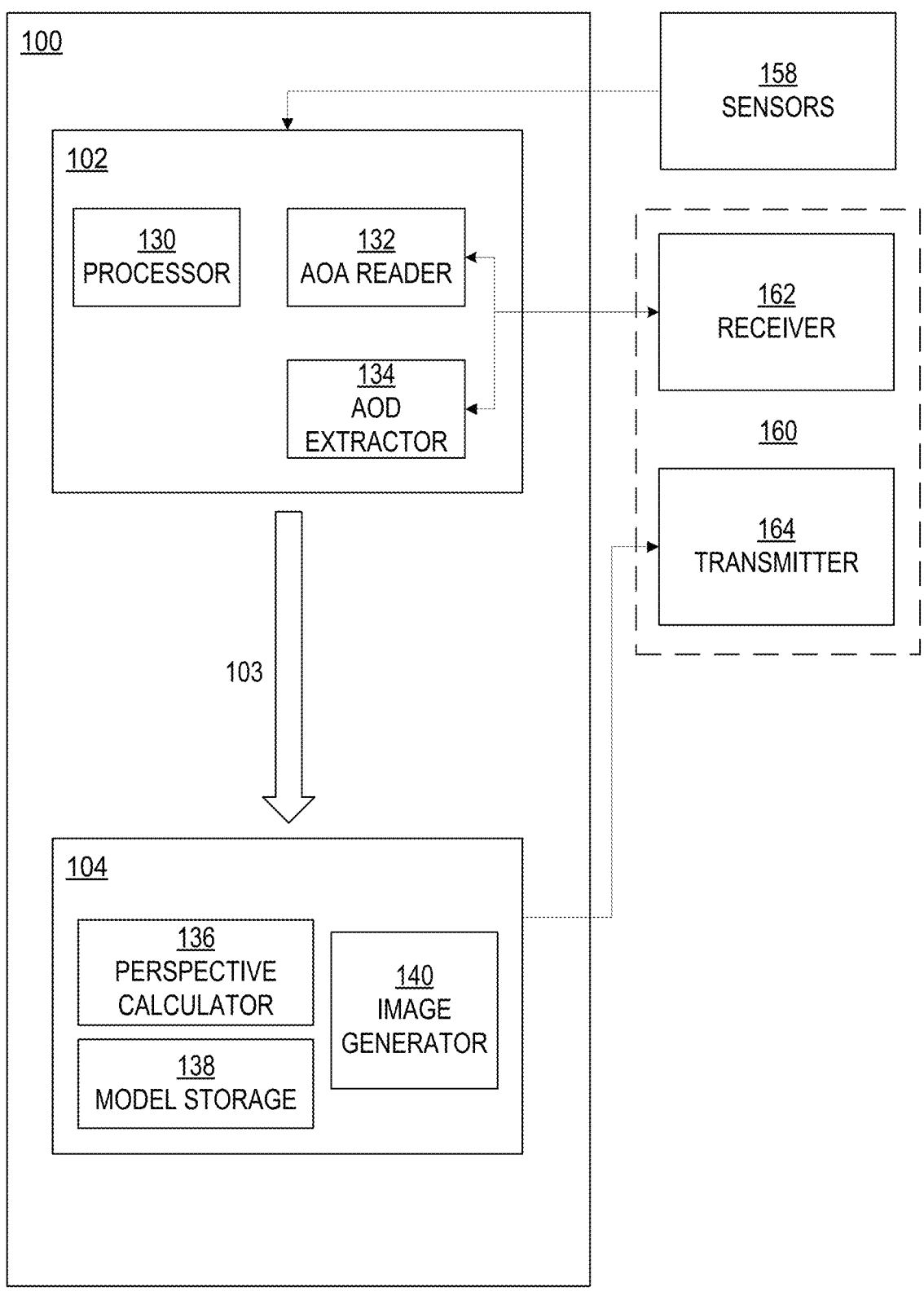
FIG. 1B is a diagram of an apparatus to receive the transmissions according to the system of FIG. 1A and determine the perspective of the apparatus, depicting internal components of the apparatus and connected peripheral components, according to some embodiments.

FIGS. 1A and 1B depict an apparatus 100 for determining perspective information. Apparatus 100 includes an orientation determiner 102 and a model generator 104, provided as a part of or equipped to a first vehicle 114. Orientation determiner 102 is configured to receive a transmission 108 from a remotely-located station 106, which is mounted to or a part of a second vehicle 116. Based upon the one or more received transmissions 108, in various embodiments orientation determiner 102 is configured to determine an angle of arrival 110 of transmissions 108, which is then used by model generator 104 to determine perspective information about the perspective of apparatus 100, which may be a perspective of first vehicle 114, as seen by station 106 and/or second vehicle 116. Alternatively or additionally, in other embodiments an angle of departure 112 provided by station 106, which may be with respect to second vehicle 116, may be used for generating perspective information. The perspective information may then be transmitted by apparatus 100 back to station 106. In some embodiments, first and second vehicles 114 and 116 are in 3D space, and so may be above or below each other in addition to lateral orientation. Such an orientation may be presented where first and second vehicles 114 and 116 are flying drones.

In embodiments, station 106 may be a part of apparatus 100, and first vehicle 114 and second vehicle 116 may both be equipped with an apparatus 100 that may act as both a transmitting station 106 as well as include orientation determiner 102 and model generator 104. Station 106 may be structurally identical to apparatus 100, with the designation of station 106 only serving to indicate its role as receiving perspective information from apparatus 100.

Orientation determiner 102 is configured to calculate or otherwise measure the angle of arrival 110 from which a transmission 108 is received. The direction may be measured by or supplied to orientation determiner 102 with respect to a centerline 118 of first vehicle 114. Alternatively, the direction may be measured with respect to a fixed reference, such as magnetic or true north, or with reference to another fixed point. Suitable techniques for determining transmission detection may include use of an antenna array to detect direction via phase difference and/or signal strength, use of a mechanical or electronically steerable antenna or antenna array, or any other suitable method for determining the bearing of a radio signal now known or later developed. Orientation determiner 102, in some embodiments, is configured to be in communication with a transceiver, or receiver, of apparatus 100 to determine the angle of arrival 110 of a transmission 108 from a station 106, according to the specific direction-finding technique or techniques employed. In some embodiments, apparatus 100 is configured with a discrete receiver, transmitter, or transceiver, which may be in communication with orientation determiner 102. In other embodiments, the receiver or transceiver may be a part of or integrated into orientation determiner 102. Orientation determiner 102 may directly interface with a receiver or transceiver hardware to obtain the angle of arrival 110 measurements, or may receive the angle of arrival 110 from receiver or transceiver electronics, or other controlling circuitry.

In the example seen in FIG. 1A, angle of arrival 110 is approximately 100-110 degrees from the centerline. Angle of arrival 110 may also be used as an angle of departure for subsequent transmissions that may come from apparatus 100, to be directed to station 106 on second vehicle 116. In embodiments where angle of arrival 110 is expressed with respect to first vehicle centerline 118, angle of arrival 110 will change over time if first vehicle 114 turns, moves, or otherwise changes direction, even if second vehicle 116 is parked or otherwise stationary. Angle of arrival 110 may be expressed in any fashion suitable to convey the direction of transmission 108 relative to the orientation of first vehicle 114. For example, angle of arrival 110 may be expressed as a certain number of degrees or radians in a clockwise or counterclockwise fashion from centerline 118.

In other embodiments, orientation determiner 102 is configured to be able to determine the orientation of apparatus 100/first vehicle 114 on the basis of angle of departure 112, which may be received from station 106 on second vehicle 116 via a transmission 108. Such information may express the angle of departure 112 with reference to a common fixed frame of reference, such as magnetic or geographic (true) north. Alternatively, angle of departure 112 may be expressed relative to a centerline 120 of second vehicle 116, with second vehicle 116 also supplying information about its heading relative to magnetic or true north. Where orientation determiner 102 determines the orientation of apparatus 100 on the basis of a provided angle of departure 112, orientation determiner 102 may not need to interface with a receiver or transceiver apart from simply receiving transmission 108 and its included angle of departure 112. Further, some such embodiments may be able to use a relatively simple omnidirectional antenna on a receiver or transceiver to feed orientation determiner 102, as the data needed to determine the orientation of apparatus 100/first vehicle 114 may be supplied by station 106 via transmission 108.

By obtaining the orientation of first vehicle 114 with reference to the common frame of reference (e.g., the orientation of first vehicle 114 with respect to geographic or magnetic north), orientation determiner 102 is able to provide model generator 104 with orientation information sufficient to allow generation of perspective information. Such information may be determined by orientation determiner 102 even where apparatus 100 cannot ascertain the direction of a transmission 108, such as where apparatus 100 does not include a receiver or transceiver equipped to facilitate direction finding. In still other embodiments, a combination of both measured angle of arrival 110 and supplied angle of departure 112 may be used to increase accuracy and/or reliability of a determined orientation.

Angle of arrival 110 and/or angle of departure 112 may further be used where apparatus 100 and/or station 106 are in motion. Apparatus 100 and/or station 106 may convey, via transmission 108, motion information to the other that may facilitate steering transmission 108 directionally to where either apparatus 100 or station 106 is expected to be located.

In other possible embodiments of apparatus 100, orientation determiner 102 may use techniques other than, or in connection with, an angle of arrival 110 or angle of departure 112 to ascertain the orientation of apparatus 100/first vehicle 114. For example, sound waves may be used in connection with a Doppler shift (if one or both of first vehicle 114 or second vehicle 116 are moving) to ascertain the bearing of second vehicle 116 and possibly its speed. An array of microphones, for example, may be utilized to determine the sound direction in a manner similar to direction finding of radio transmissions.

Model generator 104, in some embodiments, is provided with orientation information from orientation determiner 102, based upon the angle of arrival 110 or angle of departure 112 (with any corresponding reference information). With orientation information, model generator 104 calculates information reflecting the perspective of first vehicle 114. In some embodiments, orientation information may simply be the angle of arrival 110 expressed with respect to centerline 118. Other embodiments, such as where angle of arrival 110 is expressed with respect to an external reference such as true north, may supply model generator 104 a particular angle with respect to centerline 118. Perspective information generated by model generator 104 may vary depending upon a given implementation of apparatus 100 and/or station 106. In some embodiments, perspective information may simply comprise an angle with respect to the centerline 118 of apparatus 100/first vehicle 114. In other embodiments, perspective information may comprise an image or images of apparatus 100/first vehicle 114 as expected to be seen from the position of station 106. In still other embodiments, perspective information may comprise a model of apparatus 100/first vehicle 114, along with the aforementioned angle data. In further embodiments, perspective information may include shape information and coordinates useful for object detection by station 106/second vehicle 116.

The particular type of perspective information to be supplied by apparatus 100 may depend upon the capabilities of station 106. For example, where station 106 is equipped with a 3D model of apparatus 100/first vehicle 114, an angle with respect to centerline 118 may be sufficient for station 106 to derive the expected appearance of apparatus 100/first vehicle 114 from the model. Such a 3D model may also be transmitted to station 106 via a transmission 108, as mentioned above, in which case station 106 may store the transmitted model for future use, allowing subsequent transmissions 108 from apparatus 100 to only include angle information. Where the 3D model is stored with apparatus 100, perspective information may be an image or images generated by model generator 104 from the 3D model, which may then be transmitted via a transmission 108 to station 106. For example, model generator 104 may include a 3D model of first vehicle 114, and using the angle of arrival 110, may rotate the 3D model and position the virtual camera accordingly, to generate a 2D image of the model from the perspective of the camera. Such a technique may, in some examples, be similar to how a 3D model and viewpoint or camera may be manipulated by a user in a 3D modeling program. Further, perspective information may, as will be seen with respect to FIG. 2 herein, include information about the status of vehicle appearance, such as whether any doors, hood, or trunk are open that may impact on the visual appearance of apparatus 100/first vehicle 114 from the perspective of station 106. Such details may also be included in a 3D model, where, in an example, doors, hood, trunk, and other such panels may be manipulated with respect to the rest of the model.

Still further, the type of perspective information sent by apparatus 100 may depend upon the type of sensing technology that may be employed by station 106 and/or second vehicle 116. While an image or images may be useful where station 106 employs a video camera, where station 106 employs a LIDAR detector, perspective information may comprise a point cloud in 3D space that may correspond to 3D points detected by the LIDAR. Alternatively, perspective information may include 3D information where station 106/second vehicle 116 uses some form of 3D sensing such as a depth camera or range finder. Images likewise may be modified or varied where station 106 employs a camera that senses outside of visual range, e.g. UV and/or IR light. Still other variations may be possible depending upon a given implementation of station 106 and its object sensing technology.

It should be appreciated that, although FIG. 1A depicts the arrangement of first vehicle 114 and second vehicle 116 two-dimensionally, orientation and perspective information may be determined in three dimensions, for some embodiments, such as where first vehicle 114 and/or second vehicle 116 are drones, as discussed above. In such embodiments, angle of arrival 110 and/or angle of departure 112 may have two angular components, namely, an elevation and azimuth.

Components of apparatus 100, including orientation determiner 102 and/or model generator 104, in embodiments, include or is implemented using, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA), which may be customized to determine orientation of apparatus 100 (and by association, first vehicle 114) and/or to generate a model of apparatus 100/vehicle 114. The operational logic of orientation determiner 102 and/or model generator 104 will be further described below with references to FIGS. 1B and 5.

In FIG. 1B, the components of one possible embodiment of apparatus 100, including orientation determiner 102 and model generator 104, are depicted. For the illustrated embodiments, orientation determiner 102 includes a processor 130, an angle of arrival (AOA) reader 132, and an angle of departure (AOD) extractor 134. Processor 130 may be a general purpose or application specific processor, as described above. For example, processor 130 may be a processor 504 that is part of a computer device 500, as described herein with respect to FIG. 5. Processor 130 is in data communication with AOA reader 132 and AOD extractor 134. AOA reader 132 and AOD extractor 134 are in turn shown in communication with a receiver 162.

Receiver 162, in one possible embodiment, is a millimeter wave receiver configured to allow detection of the direction of a received transmission. In addition to the content of the transmission, receiver 162 can be read by AOA reader 132 to determine the transmission direction. Such a direction may, as discussed herein, be expressed as an angle relative to a reference direction, such as the centerline 118 of first vehicle 114. AOA reader 132 can either query receiver 162 for the transmission direction, automatically receive the direction as part of the received transmission, or, in some embodiments, can calculate the direction in cooperation with receiver 162, based upon raw information from receiver 162, which will depend on the selected direction finding technique employed by receiver 162.

Receiver 162 is also in communication with AOD extractor 134. In some embodiments, station 106 may provide an angle of departure via a transmission 108, which AOD extractor 134 can extract and decode.

AOA reader 132 and, where an angle of departure is provided by station 106, AOD extractor 134 supply their respective AOA and AOD to processor 130. Processor 130 will determine and format the data into an orientation of first vehicle 114 with respect to station 106. Processor 130, in the depicted embodiment, executes one or more software routines to perform the necessary trigonometric calculations from the AOA and AOD to compute the orientation. Orientation determiner 102 is in data communication 103 with model generator 104, and so supplies the determined orientation (expressed as a direction) to model generator 104.

Model generator 104, in the depicted embodiment, includes a perspective generator 136 (which can be implemented as a processor 504 and appropriate software, or via custom circuitry as described above), model storage 138, and an image generator 140. Some of the components may be omitted or moved to other locations, depending upon a given implementation. Perspective generator 136 receives the determined direction or orientation, and, using a model of first vehicle 114 stored in model storage 138, calculates the appearance of first vehicle 114 based upon the determined orientation. The model in model storage 138 may be of a 3D type, such as may be generated by 3D modeling software. This appearance is then supplied to image generator 140, which creates perspective information appropriate for the type of object recognition employed by station 106. The information is then supplied to transmitter 164 for broadcasting back to station 106. The functionality of receiver 162 and transmitter 164 may be combined into a transceiver 160.

It should be understood that in other embodiments of apparatus 100, orientation determiner 102 and model generator 104 may use a different arrangement of components, including different types. For example, in one particular embodiment, apparatus 100 is implemented as software, such as instructions 604 stored on a medium 602 (described further with respect to FIG. 6) to be executed by a computer device 500 (described herein with respect to FIG. 5).

Apparatus 100 and/or station 106, in embodiments, may be in communication with a remote server 150, such as a cloud service or edge server, configured to carry out at least some of the functionality of orientation determiner 102 and/or model generator 104. For example, server 150, in some embodiments, is used to store a library of models for possible implementations of apparatus 100/first vehicle 114. Information may be sent from apparatus 100 or station 106 indicating the particular type of first vehicle 114, to allow server 150 to access the appropriate model. Using an external server 150 may allow models to be automatically updated as new vehicle types equipped with an apparatus 100 become publicly available. Further, server 150, in some embodiments, is configured to allow for downloading of models to an apparatus 100 or station 106, thereby potentially enabling apparatus 100 or station 106 to save on storage space when used in an environment where multiple different vehicle types are encountered.

Transmissions 108 are directly related to carrying out object detection enhancement in various embodiments, or may be incidental. In some embodiments, the transmissions 108 are used for general vehicle to vehicle or vehicle to any transmissions, such as exchanging data between CA/AD vehicles to help facilitate assisted or autonomous driving functions. Further, transmissions 108 may be part of an ongoing V2V or V2X communication process, which process may include an exchange of orientation and perspective information as described above. In embodiments, transmissions 108 may be carried in a millimeter wave frequency, which may enhance accurate determination of signal directions due to the relatively highly directional nature of millimeter wave transmissions. One possible range for such transmissions is from approximately 25 to 60 GHz frequency. In addition to being highly directional and so enabling a relatively precise determination of angles of departure or arrival, such millimeter wave transmissions also support very high bandwidth, allowing for the exchange of a large amount of information in a short timeframe.

In other embodiments, transmissions 108 may be via different radio frequencies, such as WiFi bands in the 2.4 GHz and 5 GHz range, various cellular bands, or other radio frequencies. Any radio transmission technology that allows for exchange of sufficient data and sufficiently accurate orientation determination may be employed, with the specific technology employed depending upon the particular requirements of a given implementation. For example, where station 106 or apparatus 100 may employ a robust object detection algorithm, radio technology that provides a less precise orientation determination may nevertheless be serviceable as it may still result in acceptable detection of apparatus 100/first vehicle 114. Alternatively, station 106 may be able to extrapolate a range possible appearances for apparatus 100/first vehicle 114 from a 3D model that encompasses the possible range of inaccuracy for a given radio transmission technology, thereby enabling use of a variety of different radio technologies.

Station 106, as discussed above, in some embodiments, may be a part of apparatus 100, or may be separate. In some examples, station 106 may comprise discrete receiving and transmitting portions or sections. In other examples, station 106 may comprise transceiver circuitry, incorporating both receiving and transmitting capabilities.

Apparatus 100 and station 106 (which, in some embodiments, may be implemented as an apparatus 100) may include one or more radios capable of transmitting and receiving signals using various suitable wireless communications techniques, which may be coupled to or part of orientation determiner 102 and/or model generator 104. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the communication block 110 may operate in accordance with one or more applicable standards in any version. To this end, the communication block 110 may include, for instance, hardware, circuits, software, or any combination thereof that allows communication with external computer systems.

In some specific non-limiting examples, the communication block 110 may comport with the Institute of Electrical and Electronics Engineers (IEEE) 802.11 standard (e.g., Wi-Fi), a Bluetooth®, ZigBee®, near-field communication, or any other suitable wireless communication standard. In addition, the communication block 110 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

First vehicle 114 and second vehicle 116 may be any type of vehicle suitable for use with apparatus 100. In addition to passenger vehicles, including CA/AD vehicles, apparatus 100 can be provided to trucks, vans, busses, and commercial vehicles. Other potentially useful vehicles include boats, planes, drones, motorcycles, or other suitable conveyances. As mentioned above, the designation of station 106 is for descriptive purposes only herein; station 106, in some embodiments, is another instance of apparatus 100. In other embodiments, station 106 comprises specific circuitry or equipment that is a part of or separate from apparatus 100 (and may be in communication with apparatus 100), such as object detection circuitry or a separate unit for processing perspective information and providing it to an object detector.

Apparatus 100, in some embodiments, is a standalone unit, capable of being attached or interfaced with a vehicle. In other embodiments, apparatus 100 is provided as an integral part of a vehicle, and may be in communication with a vehicle's navigation systems, if so equipped. In still other embodiments, apparatus 100 may be a part of a vehicle's autonomous driving, computer assistance, or navigation systems.

Figure 2:
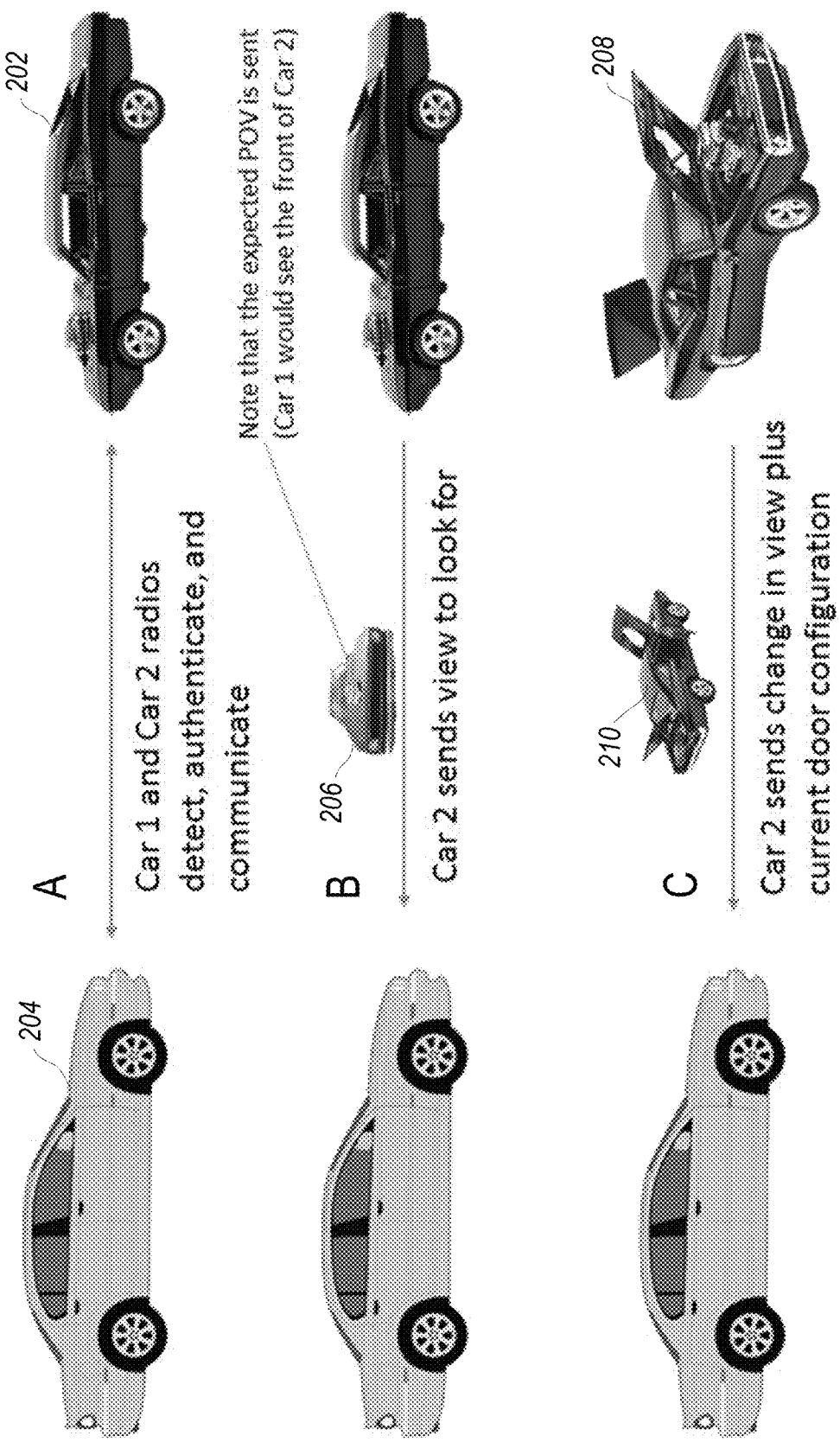
FIG. 2 illustrates the exchange of transmissions and associated data between a sending station and a receiver, including a determined perspective, according to various embodiments.

FIG. 2 depicts an exchange of transmissions 108 between a first car 202 and a second car 204, according to one possible embodiment. In initial exchange A, for the illustrated embodiments, first car 202 and second car 204 exchange radio transmissions 108 for preliminary and/or unrelated transactions, such as initial detection, authentication, and data communication. Second car 204 initiates communications with first car 202 by either a directed communications request, a general broadcast for any vehicles that may be in the vicinity of second car 204, or another type of communication. First car 202 then receives a transmission, and then respond to second car 204 with a request to authenticate. In another example, first car 202 may initiate communications, such as with an unrelated V2V exchange. Second car 204 may detect the transmission and query first car 202 to provide its perspective.

The initial exchange A allows first car 202 to determine the position of second car 204 with respect to first car 202 via direction finding, as described above. First car 202 and second car 204, in some embodiments, also authenticate to each other, to ensure that any exchanged information, such as orientation and perspective information, is only received by the intended second car 204. Authentication may assist in an environment with multiple vehicles that may be capable of exchanging or receiving perspective information, to ensure that perspective information is not unintentionally used by the wrong vehicle.

In exchange B, following determination of first car 202's orientation with respect to second car 204, for the illustrated embodiments, first car 202 sends information relating to the perspective 206 that second car 204 should expect to see of first car 202. In one example, the information sent by first car 202 is simply the angle of arrival of a transmission from second car 204 to first car 202. Where second car 204 is aware of the type of car or vehicle of first car 202 and has access to a model of first car 202, second car 204 is able to calculate the expected appearance of first car 202 using the model and angle of arrival information supplied by first car 202. In another example, first car 202 calculates its expected appearance, and transmit a representation to second car 204, such as an image or images representing first car 202. Such images are then generated by first car 202 using a model.

Finally, in exchange C, for the illustrated embodiments, first car 202 sends updated information and/or models to second car 204. For example, first car 202 may change configuration 208, such as a door or other panel opening. First car 202 then transmits an updated perspective 210 to second car 204, to allow second car 204 to modify its detection to look for the new perspective of first car 202. The change in configuration 208 may be any change that would result in a different perspective appearance 210. Such changes may include a simple changing of orientation, e.g. turning or moving with respect to second car 204, changes in the external appearance such as a door, trunk, or hood opening, some combination of the foregoing, or any other change sufficiently significant that it may impact second car 204's object detection.

As noted above, first car 202 and second car 204, in some embodiments, would also authenticate to each other, thereby facilitating enhanced object detection in an environment with multiple vehicles (e.g. greater than just first car 202 and second car 204). It should be understood that first car 202, in some embodiments, can respond in turn to multiple second cars 204, to each second car 204 with its specific perspective information. Similarly, first car 202 may also act as second car 204, where it provides perspective information to other vehicles while at the same time receiving perspective information from multiple vehicles.

Figure 3:
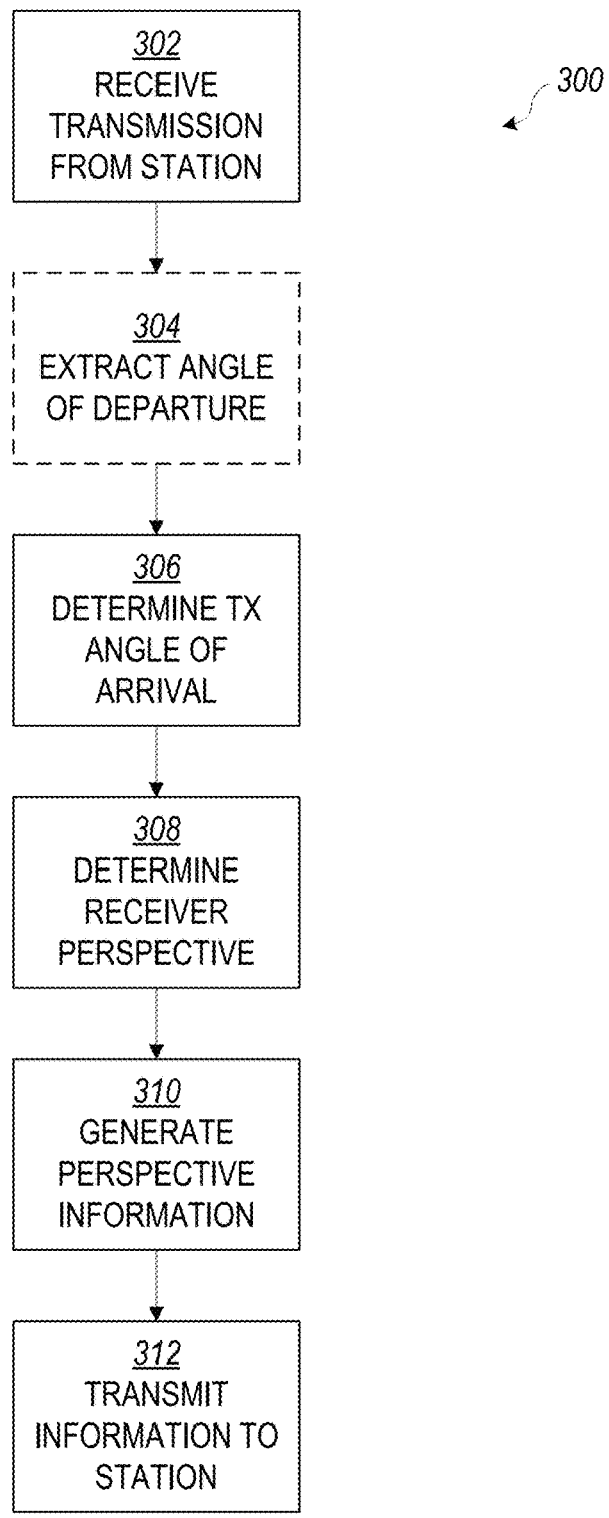
FIG. 3 is a flowchart of a method for a receiver of a transmission to generate a perspective of the receiver, according to various embodiments.

In FIG. 3, a flowchart of the various operations of a method 300 that may be carried out in whole or in part by an apparatus 100 is depicted. In operation 302, apparatus 100 receives a transmission from a station 106. The transmission may be one in a series of exchanges between apparatus 100 and station 106, may be an initial communication from station 106, or may be in response to an initial communication from apparatus 100, as described above with respect to FIG. 2.

In operation 304, an angle of departure, which may be used by an apparatus 100 in some embodiments, is extracted from the transmission if supplied by a second vehicle 116. As described above, an angle of departure, if referenced to an external standard such as a compass, can be used to determine the perspective of apparatus 100 without requiring measuring the angle of arrival of the transmission. Alternatively, the angle of departure may be used in conjunction with the angle of arrival (provided in operation 306) to provide a more precise perspective determination.

Apparatus 100 then determines the angle of arrival of a transmission from station 106 in operation 306. As described above, an orientation determiner may obtain the angle of arrival from a transceiver or receiver in embodiments. In some embodiments, apparatus 100 may utilize hardware specifically for measuring the angle of arrival of a transmission, which may be separate from a receiver or transceiver, and may be separate from or part of an orientation determiner.

With the angle of arrival and/or angle of departure, apparatus 100 then determines the perspective for the apparatus 100 and/or any vehicle to which it is attached in operation 308, with respect to the station 106. This perspective may then be used to generate perspective information in operation 310, which may be performed, for example, by a model generator as described above. As described above, the perspective information may be generated from a model of apparatus 100 and/or any associated vehicle, and may take various forms depending upon the specifics of a given implementation of apparatus 100. Finally, the perspective information is transmitted in operation 312 back to station 106 for use in object detection.

Figure 4:
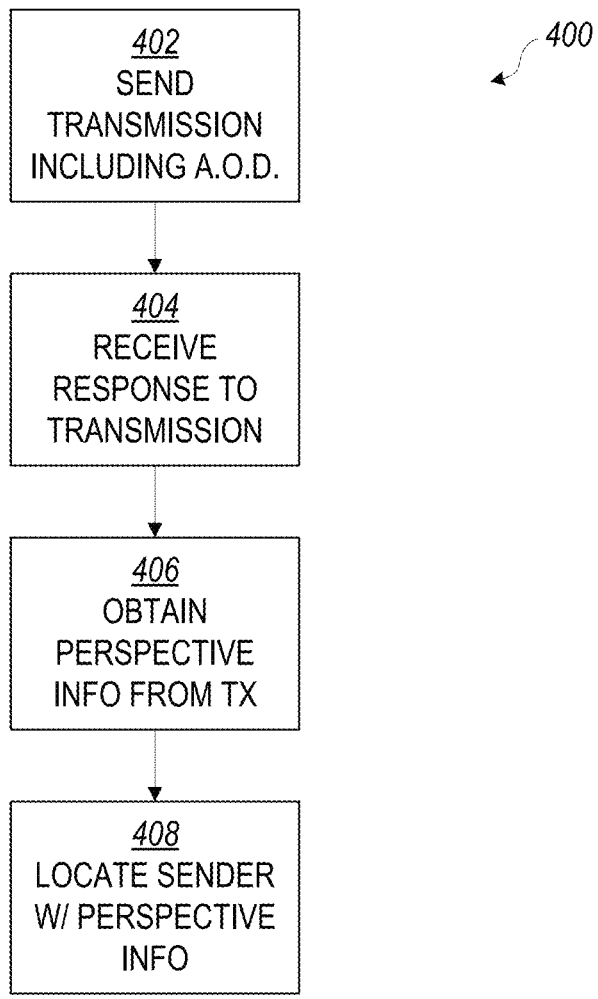
FIG. 4 is a flowchart of a method for a sender of a transmission to perform object detection from a perspective received from a receiver, according to various embodiments.

FIG. 4 is a flowchart of a method 400 that may be executed in whole or in part by an apparatus 100 that is acting as a station 106, to receive perspective information. In operation 402, station 106 transmits a request to a vehicle, and may optionally include the angle of departure (if the direction of the vehicle to which the request is being sent is known), along with any external reference information that may be needed to allow the angle of departure to be used. This operation may be omitted in implementations that do not use an angle of departure, or where the direction of the vehicle to which the request is being sent is not known to allow a transmission to be directionally transmitted.

In operation 404, the vehicle receiving the transmission from operation 402 determines a perspective of the vehicle from the point of view of station 106, as detailed above with respect to method 300, and send perspective information back to station 106. The station 106 obtains this perspective information from the transmission (or transmissions) in operation 406. As discussed above, the perspective information may take various forms depending on how station 106 is implemented; in some instances, the perspective information may be an image of the vehicle sending the perspective information.

Once the perspective information is received, in operation 408 the perspective information is used by station 106 to locate the vehicle sending the perspective information. In other embodiments, station 106 may pass the information on to another system or portion of an attached vehicle, such as a computer assistance or autonomous driving system, for further processing and detection. For example, the information may be used by station 106 or its associated vehicle in conjunction with the vehicle's known heading (e.g. compass bearing) to both determine where to conduct object recognition, as well as the specific shapes or patterns to scan for based upon the orientation of the vehicle sending perspective information relative to station 106. This information may thus allow station 106 and any associated vehicle to more efficiently and accurately detect the other vehicle.

As suggested by FIG. 2, methods 300 and 400 may be iterative. As the position of first vehicle 114 and second vehicle 116 shift with respect to each other, e.g. if one or both vehicles is in motion, or if the configuration of first vehicle 114 changes, such as a door opening or the vehicle turning, methods 300 and 400 may be repeated, at least partially, periodically to provide second vehicle 116 with updated perspective information of first vehicle 114. Such updates may be triggered to happen automatically when either first vehicle 114 or second vehicle 116 recognizes a potential change in configuration, or may be on a timed periodic basis. In still other embodiments, an external server, such as server 150, may coordinate updates.

Figure 5:
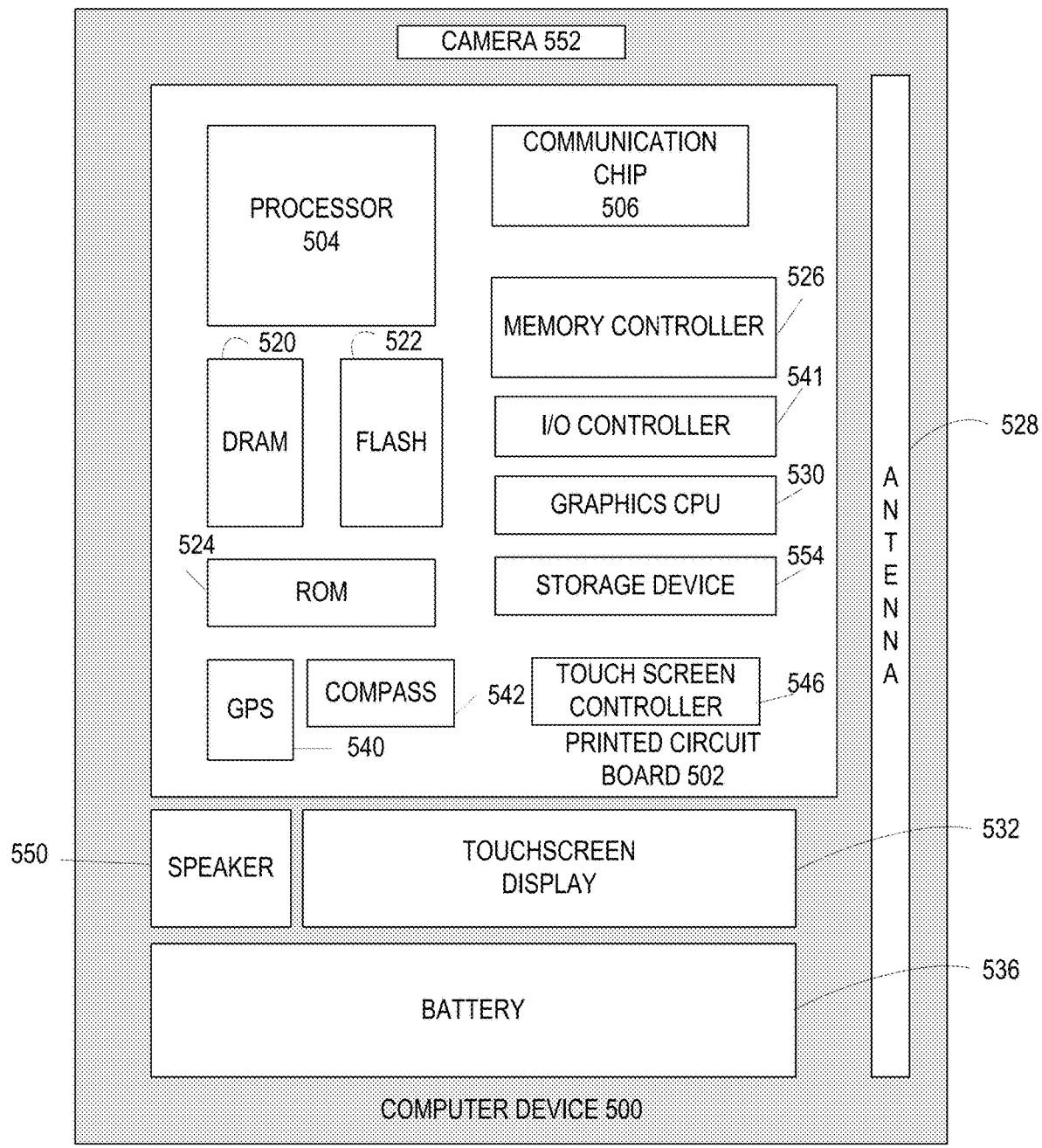
FIG. 5 is a block diagram of an example computer that can be used to implement some or all of the components of the system or methods disclosed herein, according to various embodiments.

FIG. 5 illustrates an example computer device 500 that may employ the apparatuses and/or methods described herein (e.g., orientation determiner 102 and/or model generator 104 of apparatus 100; station 106), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the object detection enhancement methods described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

Communications chips 506 may be used to implement the transmitter, receiver, or transceiver components of apparatus 100, such as part of or in communication with orientation determiner 102.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) orientation determiner 102 and/or model generator 106 of apparatus 100. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

EXAMPLES

The following examples pertain to further embodiments.

Example 1 is an apparatus comprising an orientation determiner to determine a direction of a transmission received from a station, relative to a position of the apparatus, and determine a perspective of the apparatus as viewed from the station from the determined transmission direction; and a model generator coupled to the orientation determiner to generate information about the apparatus based upon the perspective determined, and cause the information to be transmitted to the station.

Example 2 may include the subject matter of example 1, wherein the information about the apparatus comprises an image of the apparatus as viewed from the station.

Example 3 may include the subject matter of example 2, wherein the image of the apparatus is generated from a 3-D model of the apparatus.

Example 4 may include the subject matter of example 1, wherein the information about the apparatus comprises a depth point cloud.

Example 5 may include the subject matter of any of examples 1-4, wherein the received transmission comprises a radio signal.

Example 6 may include the subject matter of example 5, wherein the received transmission comprises a millimeter wave transmission.

Example 7 may include the subject matter of example 6, further comprising a millimeter wave transceiver, and the information is to be transmitted to the station using the millimeter wave transceiver.

Example 8 may include the subject matter of any of examples 1-4, wherein the received transmission comprises an audio signal.

Example 9 may include the subject matter of example 8, wherein the apparatus is to determine the direction of the audio signal and the perspective of the apparatus based at least in part upon a Doppler shift of the audio signal.

Example 10 may include the subject matter of any of examples 1-9, wherein the transmission received from the station includes a unique station ID, and the representation to be transmitted to the station includes the unique station ID.

Example 11 may include the subject matter of any of examples 1-10, wherein the apparatus is part of a vehicle navigation system.

Example 12 may include the subject matter of example 11, wherein the vehicle navigation system is part of a computer-assisted or autonomous driving vehicle, and the representation of the apparatus is a representation of the vehicle.

Example 13 may include the subject matter of any of examples 1-12, wherein the model generator is to provide the perspective determined to a remote server for generating the perspective information.

Example 14 is a method, comprising receiving a transmission by a station, the transmission including information about the transmission source based upon a perspective of the transmission source as viewed from the station; and locating, by the station, the transmission source relative to the station based upon the received information, wherein the perspective of the transmission source is determined based at least in part upon an angle of departure of the transmission from the transmission source.

Example 15 may include the subject matter of example 14, wherein the information comprises a model approximating the appearance of the transmission source as viewed from the station.

Example 16 may include the subject matter of example 15, wherein the model is an image, and locating the transmission source comprises using the model with an object recognition algorithm to detect the transmission source.

Example 17 may include the subject matter of example 14, wherein the information comprises a depth point cloud, and locating the transmission source comprises using LIDAR to generate a depth point cloud of objects around the station; and matching the depth point cloud of the information with the generated depth point cloud.

Example 18 may include the subject matter of example 14, further comprising generating a perspective image of the transmission source from the received information using a 3D model of the transmission source.

Example 19 may include the subject matter of any of examples 14-18, further comprising receiving, by the station, updated information about the transmission source based upon a change of configuration of the physical appearance of the receiver.

Example 20 may include the subject matter of any of examples 14-19, wherein the received transmission comprises a radio signal.

Example 21 may include the subject matter of example 20, wherein the received transmission comprises a millimeter wave transmission.

Example 22 may include the subject matter of any of examples 14-19, wherein the received transmission comprises an audio signal.

Example 23 may include the subject matter of example 22, wherein the perspective of the transmission source is determined based at least in part upon a Doppler shift of the audio signal.

Example 24 may include the subject matter of any of examples 14-23, wherein the transmission received by the station includes a unique station ID.

Example 25 is a non-transitory computer-readable medium (CRM) comprising instructions capable of being executed by an apparatus, that when executed cause the apparatus to receive a transmission from a station; determine an angle of arrival of the transmission; determine a perspective of the apparatus relative to the station on at least the basis of the angle of arrival; generate information representing the determined perspective; and cause the information to be transmitted to the station.

Example 26 may include the subject matter of example 25, wherein the transmitted information comprises an angle of arrival and an identifier of the nature of the apparatus.

Example 27 may include the subject matter of example 25 or 26, wherein the instructions are to further cause the apparatus to authenticate with the station.

Example 28 may include the subject matter of any of examples 25-27, wherein the received transmission comprises a radio signal.

Example 29 may include the subject matter of example 28, wherein the received transmission comprises a millimeter wave transmission.

Example 30 may include the subject matter of example 29, wherein the instructions are further to cause the apparatus to transmit the information to the station using a millimeter wave transceiver.

Example 31 may include the subject matter of any of examples 25-27, wherein the received transmission comprises an audio signal.

Example 32 may include the subject matter of example 31, wherein the instructions are further to cause the apparatus to determine the direction of the audio signal and the perspective of the apparatus based at least in part upon a Doppler shift of the audio signal.

Example 33 may include the subject matter of any of examples 25-32, wherein the transmission received from the station includes a unique station ID, and the representation to be transmitted to the station includes the unique station ID.

Example 34 may include the subject matter of any of examples 25-33, wherein the apparatus is part of a vehicle navigation system.

Example 35 may include the subject matter of example 34, wherein the vehicle navigation system is part of a computer-assisted or autonomous driving vehicle, and the representation of the apparatus is a representation of the vehicle.

Example 36 may include the subject matter of any of examples 25-35, wherein at least some of the instructions are to be executed by a remote server.

Example 37 is an apparatus, comprising means for determining the angle of arrival of a received transmission; and means for generating perspective information about the apparatus based on the angle of arrival.

Example 38 may include the subject matter of example 37, wherein the received transmission includes an angle of departure, and the means for generating perspective information is to generate perspective information using the angle of departure and the angle of arrival.

Example 39 may include the subject matter of example 37 or 38, wherein the means for generating perspective information is to provide the angle of arrival to a remote server for generating the perspective information.

Example 40 may include the subject matter of any of examples 37-39, where the means for generating perspective information is to provide the perspective information and a 3D model of the apparatus to a transmission originator.

Example 41 may include the subject matter of any of examples 37-40, wherein the apparatus is part of a vehicle navigation system.

Example 42 may include the subject matter of example 41, wherein the vehicle navigation system is part of a computer-assisted or autonomous driving vehicle, and the representation of the apparatus is a representation of the vehicle.

Example 43 may include the subject matter of any of examples 37-42, wherein the received transmission comprises a radio signal.

Example 44 may include the subject matter of example 43, wherein the received transmission comprises a millimeter wave transmission.

Example 45 may include the subject matter of example 44, wherein the apparatus is to transmit the information to the transmission originator using a millimeter wave transceiver.

Example 46 may include the subject matter of any of examples 37-42, wherein the received transmission comprises an audio signal.

Example 47 may include the subject matter of example 46, wherein the determining means is to determine the direction of the audio signal and the perspective of the apparatus based at least in part upon a Doppler shift of the audio signal.

Example 48 may include the subject matter of any of examples 37-47, wherein the apparatus to authenticate with the transmission originator.

Example 49 may include the subject matter of any of examples 37-48, wherein the received transmission includes a unique station ID, and the representation to be transmitted to the transmission originator includes the unique station ID.

Example 50 may include the subject matter of any of examples 1-13, wherein the apparatus comprises a first instance of the apparatus, and the station comprises a second instance of the apparatus.

Example 51 may include the subject matter of any of examples 37-49, wherein the apparatus comprises a first instance of the apparatus, and the transmission originator comprises a second instance of the apparatus.

What is claimed is:
1. An apparatus, comprising:
an orientation determiner to:
determine a direction of a transmission received from a station, relative to a position of the apparatus; and
determine a perspective of the apparatus as viewed from the station from the determined transmission direction; and
a model generator coupled to the orientation determiner to:
generate information about the apparatus based upon the perspective determined; and
cause the information to be transmitted to the station,
wherein the information about the apparatus comprises an image of the apparatus as viewed from the station.

2. The apparatus of claim 1, wherein the image of the apparatus is generated from a 3D model of the apparatus.

3. The apparatus of claim 1, wherein the information about the apparatus comprises a depth point cloud.

4. The apparatus of claim 1, wherein the received transmission comprises a radio signal.

5. The apparatus of claim 4, wherein the received transmission comprises a millimeter wave transmission.

6. The apparatus of claim 5, further comprising a millimeter wave transceiver, and the information is to be transmitted to the station using the millimeter wave transceiver.

7. The apparatus of claim 1, wherein the received transmission comprises an audio signal.

8. The apparatus of claim 7, wherein the apparatus is to determine the direction of the audio signal and the perspective of the apparatus based at least in part upon a Doppler shift of the audio signal.

9. The apparatus of claim 1, wherein the transmission received from the station includes a unique station ID, and the information to be transmitted to the station includes the unique station ID.

10. The apparatus of claim 1, wherein the apparatus is part of a vehicle navigation system.

11. The apparatus of claim 10, wherein the vehicle navigation system is part of a computer-assisted or autonomous driving vehicle, and the information about the apparatus is a representation of the vehicle.

12. A method, comprising:
receiving a transmission by a station, the transmission including information about a source of the transmission based upon a perspective of the transmission source as viewed from the station; and
locating, by the station, the transmission source relative to the station based upon the received information,
wherein the perspective of the transmission source is determined based at least in part upon an angle of departure of the transmission from the transmission source, and
wherein the information comprises a model approximating an appearance of the transmission source as viewed from the station.

13. The method of claim 12, wherein the model is an image, and locating the transmission source comprises using the model with an object recognition algorithm to detect the transmission source.

14. The method of claim 12, wherein the information comprises a depth point cloud, and locating the transmission source comprises:
using LIDAR to generate a depth point cloud of objects around the station; and
matching the depth point cloud of the information with the generated depth point cloud.

15. The method of claim 12, further comprising receiving, by the station, updated information about the transmission source based upon a change of configuration of a physical appearance of a receiver.

16. The method of claim 12, further comprising generating a perspective image of the transmission source from the received information using a 3D model of the transmission source.

17. A non-transitory computer-readable medium (CRM) comprising instructions capable of being executed by a processor of an apparatus, that when executed cause the apparatus to:
receive a transmission from a station;
determine an angle of arrival of the transmission;
determine an image of the apparatus as viewed from the station on at least the basis of the angle of arrival;
generate information representing the determined image; and
cause the information to be transmitted to the station.

18. The CRM of claim 17, wherein the transmitted information comprises an angle of departure and an identifier of a nature of the apparatus.

19. The CRM of claim 18, wherein the instructions are to further cause the apparatus to authenticate with the station.

20. An apparatus, comprising:
means for determining an angle of arrival of a received transmission; and
means for generating perspective information about the apparatus based on the angle of arrival,
wherein the means for generating perspective information is to provide the perspective information and an image of the apparatus to a transmission originator.

21. The apparatus of claim 20, wherein the received transmission includes an angle of departure, and the means for generating perspective information is to generate perspective information using the angle of departure and the angle of arrival.

22. The apparatus of claim 20, wherein the means for generating perspective information is to provide the angle of arrival to a remote server for generating the perspective information.

23. The apparatus of claim 20, where the image of the apparatus is a 3D model of the apparatus.

* * * * *